E. W. KITCHEN.
POTATO PLANTER.
APPLICATION FILED OCT. 22, 1910.
1,005,435.
Patented Oct. 10, 1911.
6 SHEETS—SHEET 6.
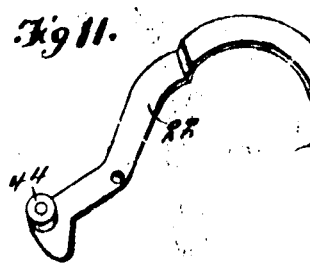
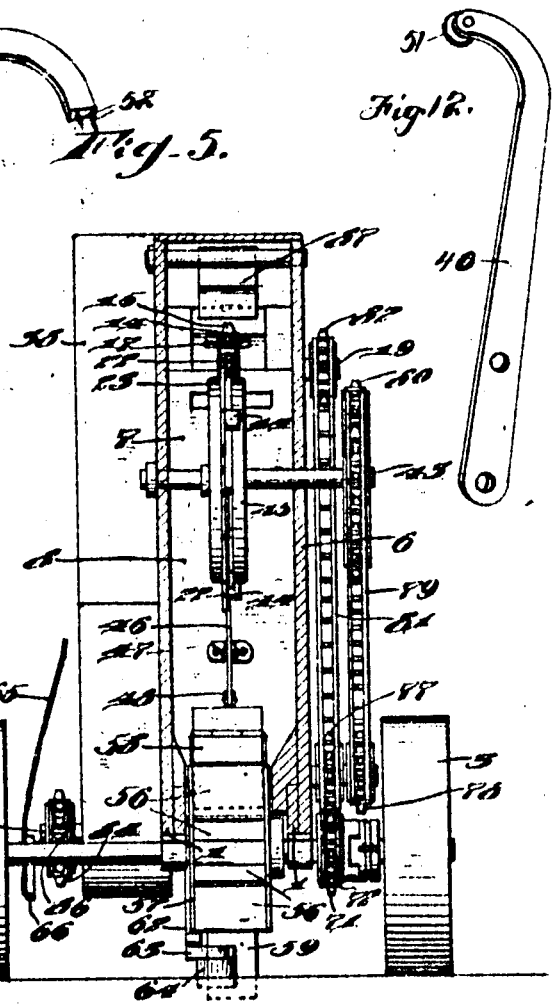

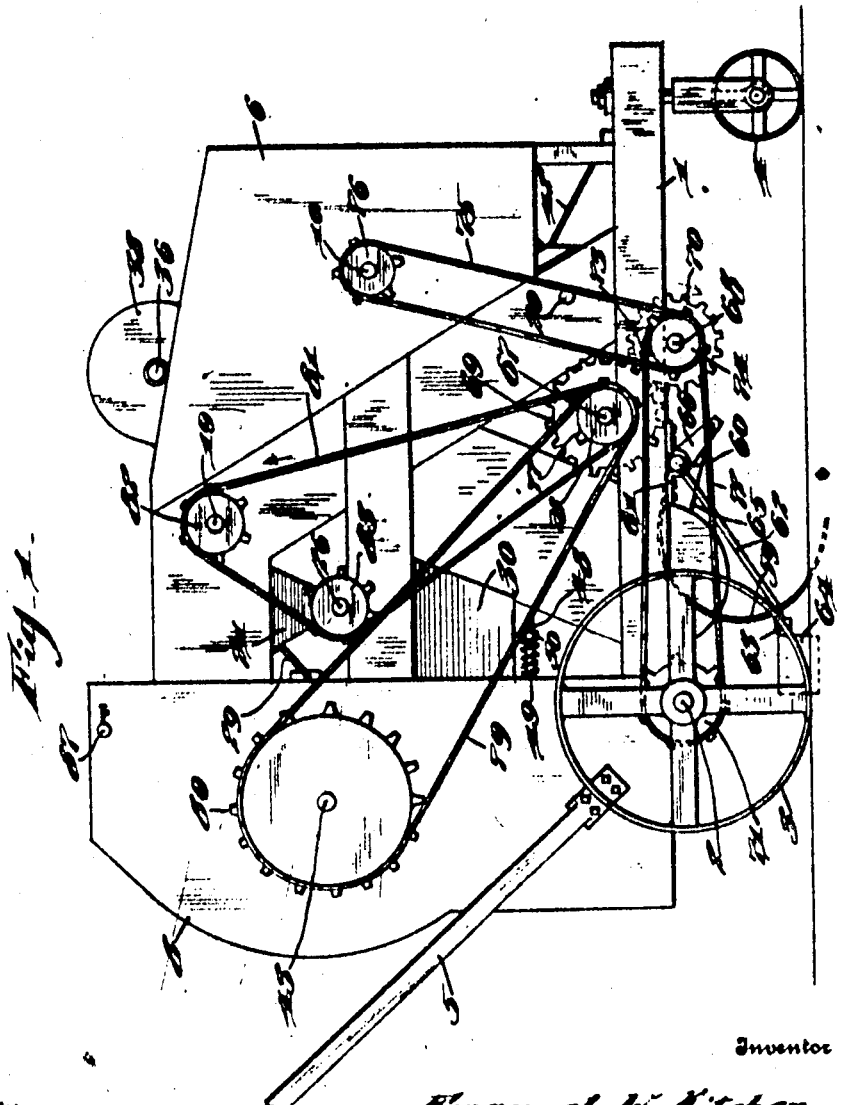

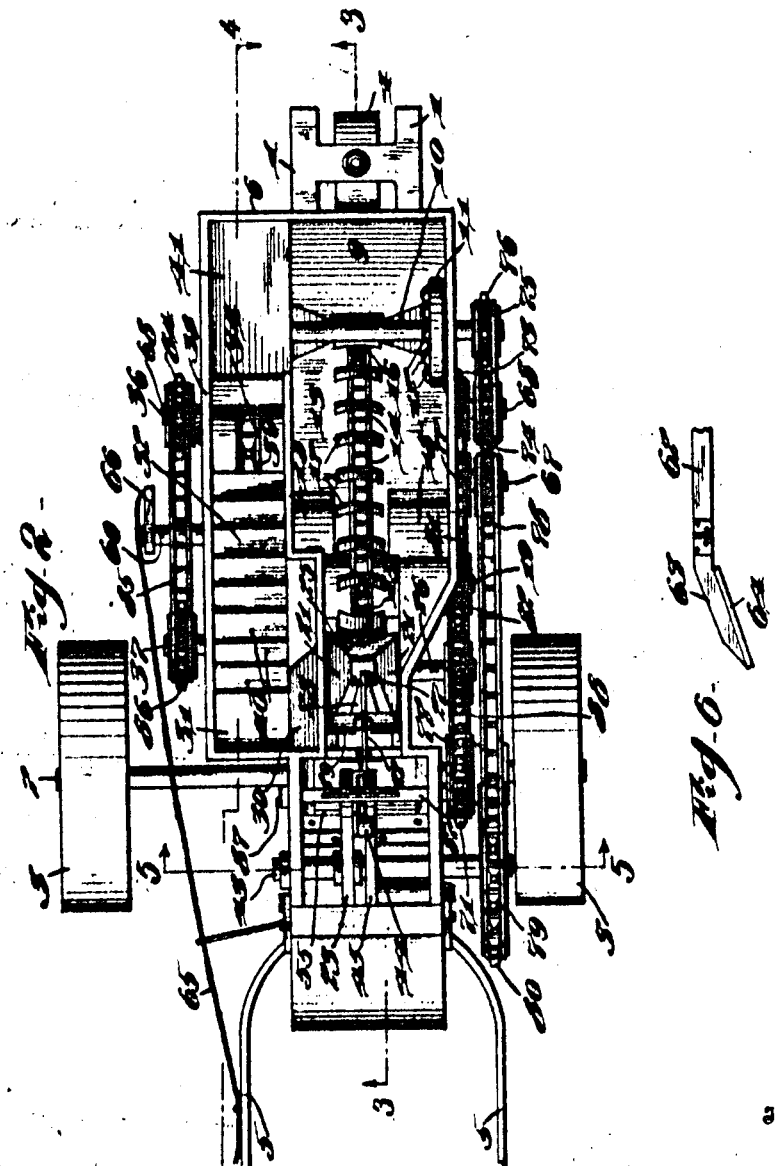

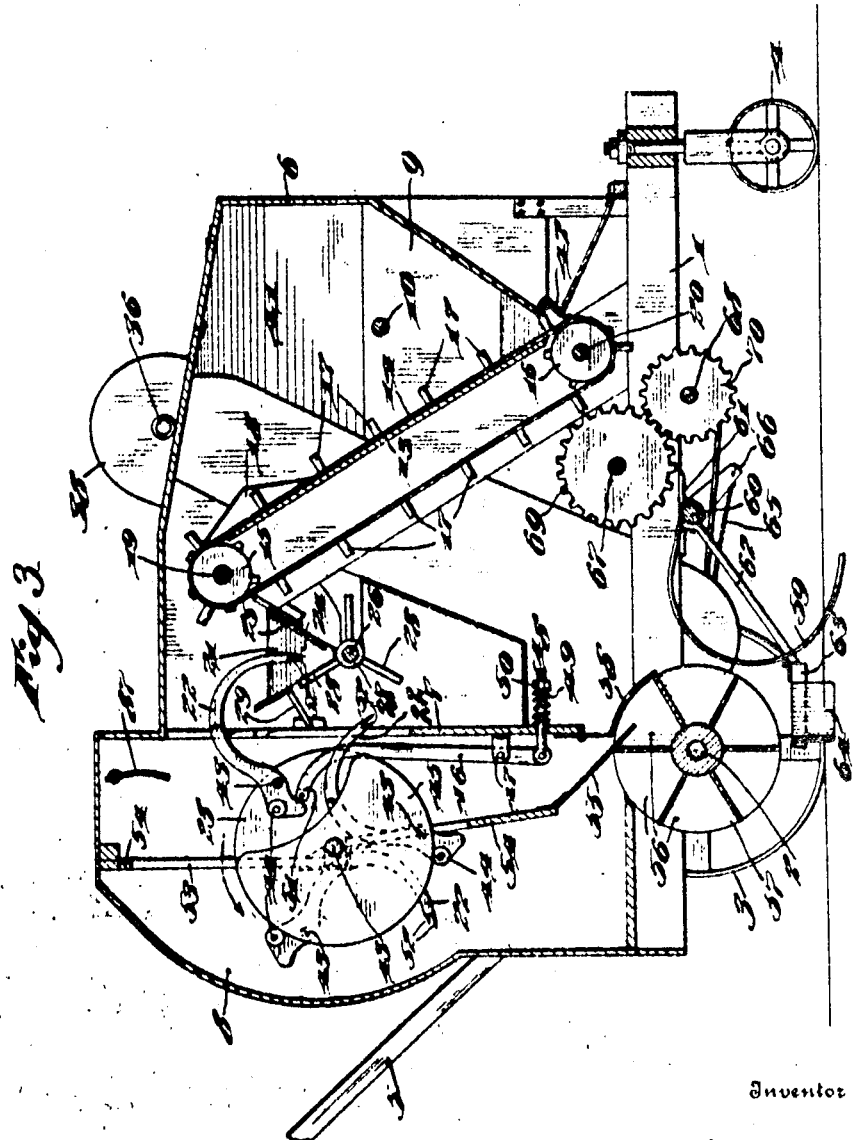

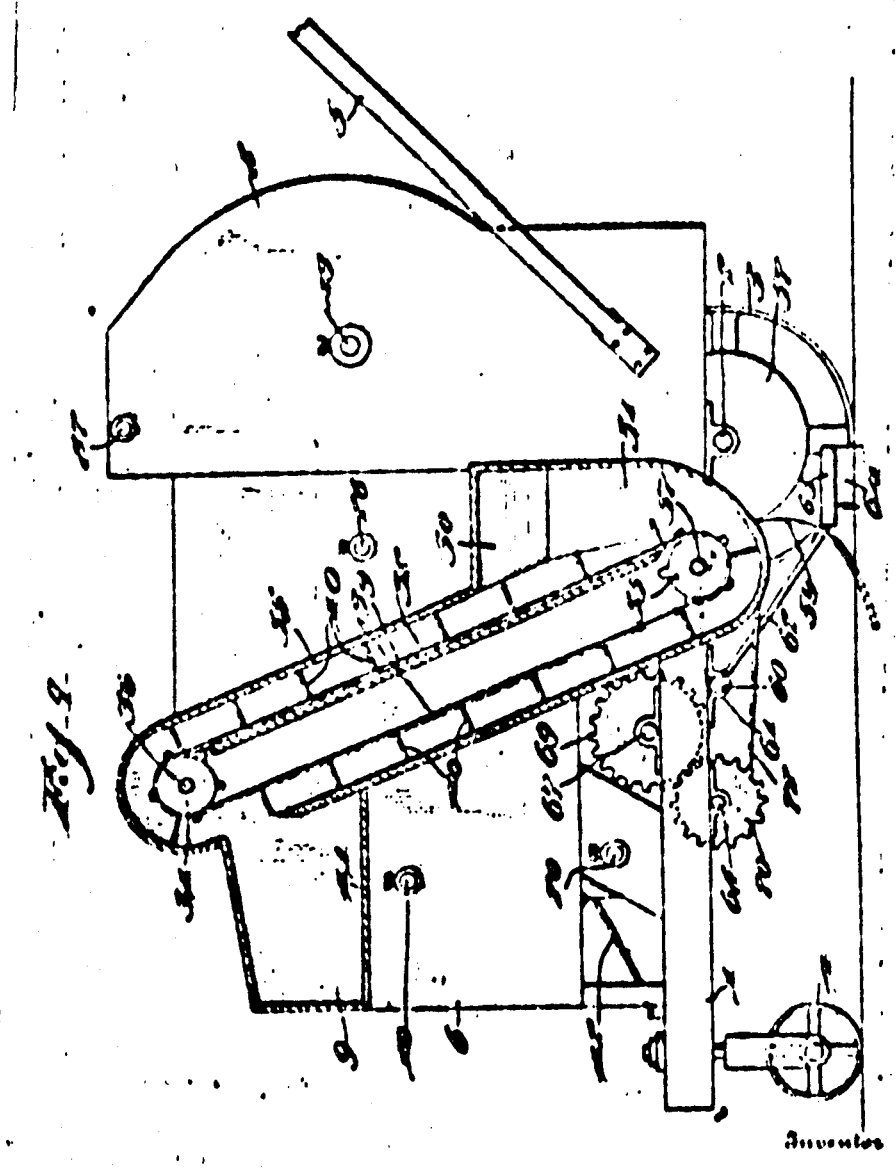

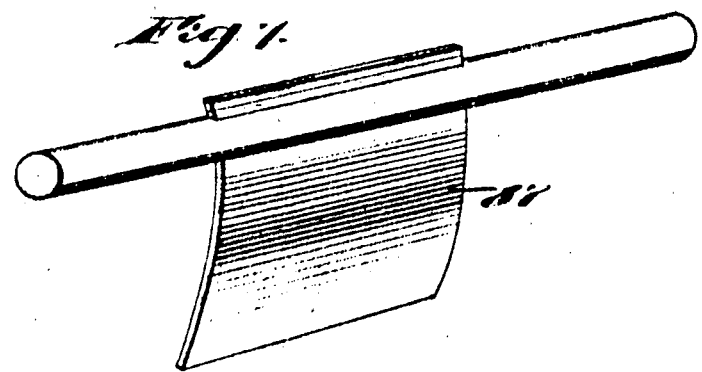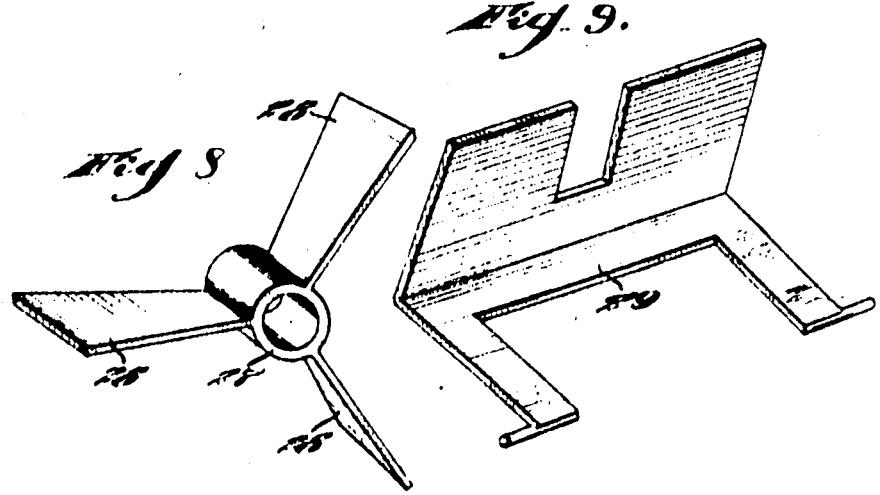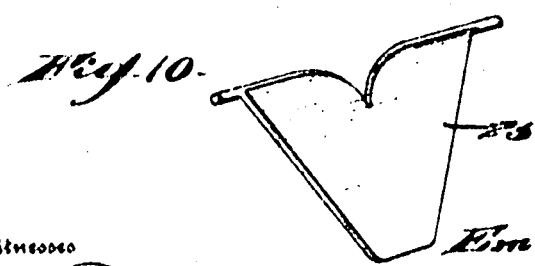

1,005,435. POTATO-PLANTER. EMANUEL W. KITCHEN, Solebury, Pa. Filed Oct. 22, 1910. Serial No. 588,509.

*To all whom it may concern:*

Be it known that I, EMANUEL W. KITCHEN, a citizen of the United States, residing at Solebury, in the county of Bucks and State of Pennsylvania, have invented certain new and useful Improvements in Potato-Planters, of which the following is a specification.

My invention relates to improvements in potato planters, an object of the invention being to provide a wheeled device of this character adapted to be drawn over the ground, and automatically drop at predetermined intervals, potato eyes or seed potatoes, into the ground prepared for their reception and covered after they are dropped.

A further object is to provide improved mechanism for elevating the potatoes into a suitable pocket, improved means for moving the potatoes one at a time from the pocket and depositing them in the pockets of a rotary dropper, which turns continuously and drops at regular intervals the potatoes in prepared ground.

A further object is to provide a device of this character with improved hopper, improved means for conveying the potatoes from the hopper into a pocket, said pocket having means for discharging superfluous potatoes into a receptacle designed for their reception, and provide a conveyer for carrying the potatoes in said last-mentioned receptacle back into the hopper.

A further object is to provide an improved set of pivoted potato engaging arms, mounted upon a rotary disk and adapted to be operated in regular order to remove potatoes from a suitable pocket and drop them onto the ground, and provide improved means for exerting spring pressure upon each of said arms as they reach a predetermined point in the rotation of the disk.

With these and other objects in view, the invention consists in certain novel features of construction and combinations and arrangements of parts, as will be more fully hereinafter described and pointed out in the claims.

In the accompanying drawings: Figure 1, is a view in side elevation illustrating my improvements. Fig. 2, is a top plan view. Fig. 3, is a view in longitudinal section on the line 3—3 of Fig. 2. Fig. 4, is a view in section on the line 4—4 of Fig. 2. Fig. 5, is a view in section on the line 5—5 of Fig. 2, and Figs. 6, 7, 8, 9, 10, 11, and 12, are views illustrating various details of construction.

1, represents a base frame which is supported at its rear on a driving axle 2, on which traction wheels 3 are fixed and the forward end of the frame 1, is supported on a caster wheel 4. Suitable mechanism (not shown) is to be provided at the forward end of the frame for the attachment of draft animals, and handles 5 project rearwardly from the planter to enable the operator to guide the device over the ground. On frame 1, a casing 6 is secured, constructed in any approved manner, and having a vertical partition 7 which forms at the rear end of the casing a chamber 8 for a purpose which will hereinafter appear. In the forward end of the casing, a hopper 9 is provided for the seed potatoes, through which a shaft 10 projects, and is provided on the shaft in the hopper with a stirrer or agitator 11, the latter comprising a disk having a circular series of knobs 12 thereon, said disk continuously revolves so as to prevent the potatoes from packing in the hopper. Over the rear wall 13 of the hopper, a chain conveyer 14 is adapted to move and passes over sprocket wheels 15, and 16, respectively. This conveyer 14 comprises a chain having a series of blades 17 thereon adapted to move the potatoes upwardly out of the hopper and this conveyer moves between enlargements 18 on partition 13, said enlargements serving to direct back into the hopper excessive potatoes which may project over the ends of the blades. The sprocket wheels 15 and 16 are secured upon shafts 19 and 20 respectively, which extend through the casing 6, and the conveyer 14 directs the potatoes over the upper sprocket wheel 15 into a pocket 21, from which they are removed one at a time by means of pivoted arms 22 on a rotary disk 23 in chamber 8.

To prevent any potatoes from falling out of the lower end of the hopper as the conveyer enters the same, a door 42 is pivoted to frame 1, and this door is opened by the passage of a blade 17, and closed by gravity.

The pocket 21 into which the potatoes are dropped by conveyer 14 is of general hopper form having fixed side plates 24, and a pivoted end plate 25. Below the pocket 21, a transverse shaft 26 is located and projects through a casing 6, and on this shaft 26 a sleeve 27 is fixed and carries a circular series of three radially disposed plates 28 which are adapted to move through pocket 21 and serve to intermittently form a complete closed pocket by constituting the rear wall of said pocket, and then move away to leave the pocket open, so that the excessive potatoes in the pocket may fall out and prevent an overaccumulation therein. A hinged plate 29 is also located at the rear end and upper portion of the pocket 21, and such plate being hinged so as to prevent any possibility of the rotary plates 28 becoming choked by the potatoes or crushing the latter. When the excessive potatoes fall out of pocket 21, they are directed by an inclined chute 30 into a pocket 31, through which an endless chain conveyer 32 passes and is supported on sprocket wheels 34, and 35 respectively, the latter being secured upon shafts 36, and 37 respectively, which project through a conveyer casing 38 at one side of the casing 6. This conveyer may of course be made in various ways, but preferably consists of a plurality of links 39, having fixed blades 40 thereon. This chain conveyer 32 directs the potatoes in pocket 31 upwardly and forwardly onto a chute 41, which directs them back into hopper 9.

The disk 23 above referred to is continuously revolved in the direction of the arrow shown in Fig. 3, and is fixed to the shaft 43 projecting through the casing 53. The arms 22 are pivotally connected by screws 43 to disk 23, and each arm is provided at one side with a roller 44 adapted to run against the edge of a cam 45 secured to a partition 54 hereinafter referred to.

46, is a lever fulcrumed between its ends on a bracket 47 and provided at its lower end with a pivoted bolt 48, which projects through the partition 7, and is provided with a coiled spring 49, the tension of which is adjusted by a nut 50. The upper free end of the lever 46 presses rearwardly and is adapted, as disk 23 revolves, to alternately engage the ends of the arms 22 to force the latter forwardly, when they are permitted this movement by the cam 45, and the arms are off-set or bent as shown more clearly in Fig. 11 to allow the arms to pass lever 46, and its roller 51 which contacts with the arms before the arms reach a point of cam 45, where they can be thrown on their pivot.

Each arm 22 is provided at its free end with two teeth 52, preferably of different lengths, which are adapted to stick into a potato in pocket 21, and remove the same from the pocket, and carry the same back into casing 8, the potato being freed from the teeth 52 when the arm moves through a restricted slot or opening 53 in a partition 54 in casing 8. The potato then falls down upon an inclined pivoted or hinged platform 55 which directs the same into any of a series of pockets 56 in a rotary dropper 57. A hinged gate 58 at the lower end of partition 7, bears against the periphery of the dropper 57, closing the pockets after they receive the potatoes, and long enough to prevent their escape, until the dropper reaches the proper position for dropping them. This proper position is in rear of a curved spring furrow-opener 59, which is fixed to a shaft 60 having an oscillatory mounting in a bearing 61 secured to the frame 1. To this shaft 60 a rearwardly and downwardly inclining bar 62 is fixed and is provided at its free end with a pivoted arm 63 to which an inclined coverer 64 is fixed. The hinging of the coverer 64 allows it to ride freely over the ground, that is, it allows it to move upwardly but its downwardly hinging movement is prevented by the abutting ends of bars 62 and arms 63. This furrow-opener, and the bar 62 may be raised and lowered by the operator by moving a cord 65 attached to bar 60 extending along one of the handles 5, and secured to a crank arm 66 on shaft 60.

67, and 68, are two transverse shafts supported on frame 1 and connected by gears 69 and 70, gear 69 being larger than gear 70, so that shaft 67 is driven at a slower speed than shaft 68.

The several shafts above described are driven by sprocket wheels and chains, as will now be pointed out. A sprocket wheel 71 on axle 2 is connected by a chain 72 with a sprocket wheel 73 on shaft 68, and a second sprocket wheel 74 on shaft 68 is connected by a chain 75 with a sprocket wheel 76 on the agitator shaft 10. As before stated, motion is transmitted from shaft 68 to shaft 67 by means of the gears 70 and 69, and on this shaft 67 two sprocket wheels 77 and 78 respectively are secured. One of these sprocket wheels is connected by a chain 79 with a sprocket wheel 80 on shaft 43, while the other of these sprocket wheels is connected by a chain 81 with sprocket wheels 82 and 83 on shafts 19 and 26 respectively. All of the above mentioned sprocket wheels and chains are preferably on one side of the planter, and shaft 68, which projects beyond the other side of the planter, is provided with a sprocket wheel 84, which is connected by a chain 85 with a sprocket wheel 86 on shaft 37.

The operation is as follows: As the machine is drawn over the ground, the several shafts are driven as above explained, and the furrow-opener 59 prepares the soil and opens a furrow for the reception of the potatoes, while the coverer 64 serves to move the soil over the potato. As the machine travels over the ground, the conveyer 14 continuously moves a number of potatoes from hopper 9 into the pocket 21, from which the arms 22, at regular intervals, move into the pockets, impale the potatoes and carry them into the chamber 8, said potatoes being knocked from the arms as they pass through the restricted opening or slot 53 in partition 54, and to prevent any possibility of the potatoes flying back a pivoted screen plate 87 is provided in chamber 8 against which such potatoes would strike and be deflected down onto the platform 55 from which they are directed into the pockets of the rotary dropper 57, and from the latter onto the ground. It is, of course, impossible to so arrange the several parts that there will always be just a single potato in pocket 21, and in order to insure that there is at least one in the pocket to be engaged by the arms, the conveyer 14 is arranged to carry more potatoes to the pocket than are necessary, but the rotary movement of the plates 28 through the pocket, directs the surplus down the inclined chute 30 into the pocket 31, and they are returned to the hopper 9 by means of the chain conveyer 32.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a potato planter, the combination with a frame, a casing supported on the frame, an axle supporting one end of the frame, traction wheels on said axle, and means supporting the other end of the frame, of a hopper in the casing, a pocket in the casing, means for conveying potatoes from the hopper into the pocket, a series of spring-pressed arms, and a spring-pressed lever constructed to engage said arms and move them to intermittently remove a potato from the pocket and drop it onto the ground, substantially as described.

2. In a potato planter, the combination with a frame, a casing supported on the frame, an axle supporting one end of the frame, traction wheels on said axle, and means supporting the other end of the frame, a hopper in the casing, a pocket in the casing, means for conveying potatoes from the hopper to the pocket, a rotary disk in the casing, and a series of arms connected to said rotary disk and a spring-pressed lever engaging said arms and constructed to move said arms to intermittently remove the potatoes from the pocket and drop them on the ground, substantially as described.

3. In a potato planter, the combination with a frame, a casing supported on the frame, an axle supporting one end of the frame, traction wheels on said axle, and means supporting the other end of the frame, a hopper in the casing, a pocket in the casing, a conveyer constructed to carry potatoes from the hopper and deposit them in the pocket, enlargements in the hopper at opposite sides of the conveyer deflecting surplus potatoes from the conveyer back to the hopper, and means for removing potatoes one at a time from the pocket and dropping them onto the ground, substantially as described.

4. In a potato planter, the combination with a frame, a casing supported on the frame, an axle supporting one end of the frame, traction wheels on said axle, and means supporting the other end of the frame, a hopper in the casing, a pocket in the casing, means for conveying potatoes from the hopper into the pocket, means for removing the potatoes one at a time from the pocket and dropping them onto the ground, and means for discharging surplus potatoes from the pocket, substantially as described.

5. In a potato planter, the combination with a frame, a casing supported on the frame, an axle supporting one end of the frame, traction wheels on said axle, and means supporting the other end of the frame, a hopper in the casing, a pocket in the casing, means for conveying potatoes from the hopper into the pocket, means for removing the potatoes one at a time from the pocket and dropping them onto the ground, said pocket having a spring wall, and a rotary series of radial plates constructed to intermittently constitute a wall of said pocket so as to intermittently open the pocket to allow the potatoes therein to escape, substantially as described.

6. In a potato planter, the combination with a frame, a casing supported on the frame, an axle supporting one end of the frame, traction wheels on said axle, and means supporting the other end of the frame, a hopper in the casing, a pocket in the casing, means for conveying potatoes from the hopper into the pocket, means for removing the potatoes one at a time from the pocket and dropping them onto the ground, said pocket having a spring wall, a rotary series of radial plates constructed to intermittently constitute a wall of said pocket so as to intermittently open the pocket to allow the potatoes therein to escape, a chute down which potatoes from the pocket are directed, and a conveyer onto which said chute directs the surplus potatoes, and said conveyer being constructed to return such potatoes to the hopper, substantially as described.

7. In a potato planter, the combination with a frame, a casing supported on the frame, an axle supporting one end of the frame, traction wheels on said axle, and means supporting the other end of the frame, a hopper in the casing, a pocket in the casing, means for conveying potatoes from the hopper into the pocket, means for removing the potatoes one at a time from the pocket and dropping them onto the ground, said pocket having a spring wall, a rotary series of radial plates constructed to intermittently constitute a wall of said pocket so as to intermittently open the pocket to allow the potatoes therein to escape, a chute down which potatoes from the pocket are directed, and a conveyer onto which said chute directs the surplus potatoes, said conveyer being constructed to return such potatoes to the hopper, and a rotary stirrer or agitator in said hopper, comprising a disk, and a circular series of knobs or projections thereon, substantially as described.

8. In a potato planter, the combination with a frame, wheels supporting the frame, an axle turned by said wheels; and a casing on the frame, of a hopper in the casing, a pocket in the casing, and means for conveying the potatoes from the hopper to the pocket, of a rotary dropper fixed on said axle and having an annular series of pockets, means for removing potatoes from the first-mentioned pocket and dropping them into the pockets of the dropper, and a hinged platform directing the potatoes into the dropper, substantially as described.

9. In a potato planter, the combination with a frame, wheels supporting the frame, an axle turned by said wheels, and a casing on the frame, of a hopper in the casing, a pocket in the casing, and means for conveying the potatoes from the hopper to the pocket, of a rotary dropper fixed on said axle and having an annular series of pockets, means for removing potatoes from the first-mentioned pocket and dropping them into the pockets of the dropper, a hinged platform directing the potatoes into the dropper, and a hinged gate closing the pockets of the dropper during a portion of their movement, substantially as described.

10. In a potato planter, the combination with a frame, wheels supporting the frame, and a casing on the frame, of a vertical partition forming a chamber at one end of the casing, a hopper in the casing, a pocket in the casing, means for conveying the potatoes from the hopper to the pocket, a rotary disk in said chamber, a series of arms pivoted to said disk and adapted to project through a slot in said partition and engage potatoes in the pocket, a cam, rollers on the arms engaging the said cam, normally holding them withdrawn or in inoperative position, and means for moving said arms on their pivots to engage the potatoes in the pockets, substantially as described.

11. In a potato planter, the combination with a frame, wheels supporting the frame, and a casing on the frame, of a vertical partition forming a chamber at one end of the casing, a hopper in the casing, a pocket in the casing, means for conveying the potatoes from the hopper to the pocket, a rotary disk in said chamber, a series of arms pivoted to said disk and adapted to project through a slot in said partition and engage potatoes in the pocket, a cam, rollers on the arms engaging the said cam, normally holding them withdrawn or in inoperative position, and a spring-pressed lever adapted to engage said arms when they reach a predetermined point and move them on their pivots to engage a potato in the pocket, substantially as described.

12. In a potato planter, the combination with a frame, wheels supporting the frame, and a casing on the frame, of a vertical partition forming a chamber at one end of the casing, a hopper in the casing, a pocket in the casing, means for conveying the potatoes from the hopper to the pocket, a rotary disk in said chamber, a series of arms pivoted to said disk and adapted to project through a slot in said partition and engage potatoes in the pocket, a cam, rollers on the arms engaging the said cam, normally holding them withdrawn or in inoperative position, a lever pivoted between its ends and adapted at one end to engage the arms at a point in the movement of the disk, a spring pressing said lever toward the arms, and means for adjusting the tension of said spring, substantially as described.

13. In a potato planter, the combination with a frame, wheels supporting the frame, and a casing on the frame, of a vertical partition forming a chamber at one end of the casing, a hopper in the casing, a pocket in the casing, means for conveying the potatoes from the hopper to the pocket, a rotary disk in said chamber, a series of arms pivoted to said disk and adapted to project through a slot in said partition and engage potatoes in the pocket, a cam, rollers on the arms engaging the said cam, normally holding them withdrawn or in inoperative position, a lever pivoted between its ends and adapted at one end to engage the arms at a point in the movement of the disk, a bolt connected to the opposite end of said lever and projecting through the partition, a spring on said bolt, and a nut on said bolt engaging the spring, whereby the tension of the spring may be regulated, substantially as described.

In testimony whereof I have signed my name to this specification in the presence of two subscribing witnesses.

EMANUEL W. KITCHEN.

Witnesses:
R. H. KRENKEL,
C. E. POTTS.